(No Model.)
C. A. TAYLOR.
TRUNK FIXTURE.
No. 395,597. Patented Jan. 1, 1889.
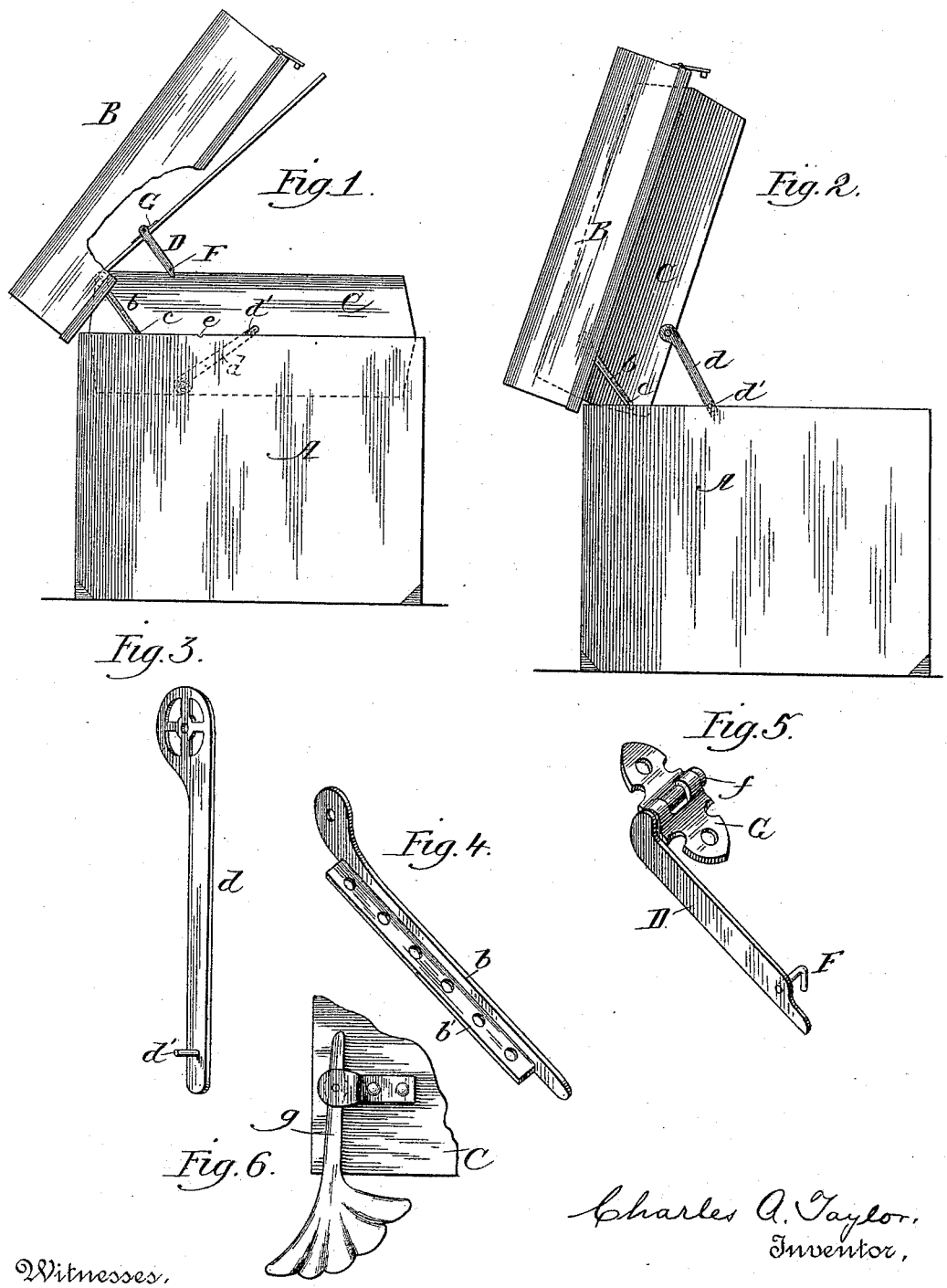
Witnesses,
Louis S. Thomason.
Henry K. Johnson
Charles A. Taylor,
Inventor,
By his Attorney
Frank D. Thomason

UNITED STATES PATENT OFFICE.

CHARLES A. TAYLOR, OF CHICAGO, ILLINOIS.

TRUNK-FIXTURE.

SPECIFICATION forming part of Letters Patent No. 395,597, dated January 1, 1889.

Application filed March 23, 1888. Serial No. 268,254. (No model.)

*To all whom it may concern:*

Be it known that I, CHARLES A. TAYLOR, of Chicago, in the county of Cook and State of Illinois, have invented certain new and useful Improvements in Trunk-Fixtures, of which the following is a full, clear, and exact description, reference being had to the accompanying drawings, and to the letters of reference marked thereon.

The object of my invention is to provide a simple fixture for trunks, by means of which the lid of the trunk and likewise of the tray can easily be maintained in an open position, and by means of which the tray can be kept closed up into the lid of the trunk when it is desired to get into the body thereof, substantially as hereinafter fully described, and as illustrated in the drawings, in which—

Figure 1 is a side elevation of a trunk with its cover and the cover of the tray therein maintained in an open position by means of my improvements. Fig. 2 is a side elevation of an opened trunk, showing the tray swung up into the lid and maintained there. Figs. 3, 4, and 5 show the several constructions of my improved fixture used in a trunk, and Fig. 6 is a view of a modified form of said fixture.

Referring to the drawings, A represents the body of a trunk, B the lid thereof, and C the tray, constructed and set within said body in the usual manner. As is well known to trunk-makers and those who have much necessity for using trunks with trays in them, when the lid is open and the tray is swung up into the same and secured therein, as shown in Fig. 2, the weight of the tray often causes the lid to drop. I avoid this by a simple brace, $b$, which is pivotally secured to the inner surface of the end of the lid near its point of oscillation, and which has a lateral flange, $b'$, projecting outward from it which terminates before it reaches the ends thereof. The outer end of this flange, when the lid is open, rests upon the upper edge of the end of the body of the trunk and forms an effective brace, substantially as shown in Figs. 1, 2, and 4. In order to prevent the lower end of the flange from slipping along the edge of the trunk which it rests upon when the lid is open, I prefer to provide a small projection or protuberance, $c$, against which the said edge abuts.

In order to maintain the tray of the trunk in an open position—that is, swung up into the lid, as shown in Fig. 2—I pivotally secure to the end of the tray, near the bottom thereof, the oscillating brace $d$. This brace $d$ has a laterally-projecting stud, $d'$, near its free end, which rests upon the upper edge of the end of the body of the trunk, and when the tray is opened drops into a suitable transverse notch, $e$, therein, thus forming a brace to maintain said tray open.

D represents a brace, which is pivotally secured to the upper surface of the lid of the tray, near its end edge, by means of the stud $f$, projecting laterally from its upper end, which is journaled in the knuckle-plate G, secured to said lid. Near the lower end of this brace projects laterally an L-shaped finger, F, which, when said brace is secured to the lid of the tray, as shown in Fig. 1, rests and rides along the upper edge of said tray above which said brace is pivoted. These three braces $d$, $b$, and D are substantially the same in construction, as shown in Figs. 3, 4, and 5, respectively, and all are modifications of the same idea. I do not wish, however, to be confined to the exact construction shown, as it is obvious that other modifications would be suggested thereby. For instance, in Fig. 6 I show an oscillating brace, $g$, which is pivoted to the under surface of the tray, near one of its rear corners, and which has its lower end so weighted that when the tray is swung up into the lid of the trunk it oscillates outward over the edge of the end of the body of the same, thus preventing the tray from closing into the trunk until it has been oscillated back from off the edge of said trunk.

The braces $d$, $b$, and D are manipulated to permit the lid of the trunk or the tray to close down to their original positions by simply moving their free ends toward the front of the trunk.

What I claim is—

1. The combination, with the body of a trunk and lid hinged to the rear upper edge thereof, of a brace, $b$, pivotally secured to the inner wall of the lid near its pivotal point and extending a suitable length, as shown, and having projecting outward a lateral rib or flange which terminates at a point near its end, which flange rests between the meeting edges of the lid and body when said trunk is closed, and the end of which forms a shoulder that rests upon the upper side edge of the body when the lid is open.

2. The combination, in a trunk, of the body part thereof, the lid thereof, and a tray hinged at the back to the rear upper edge of said body, with a brace, $d$, pivotally secured at a suitable point to the side edge of said tray, near the bottom thereof, having a projecting stud near the outer end which rests upon the upper side edge of the body of the trunk, which is provided with a transverse notch to afford a purchase for said stud when said tray is open.

3. The combination, with the body of a trunk, the lid thereof, the tray hinged to the rear upper edge of said body, the lid of said tray hinged to the rear upper edge of said tray, and the knuckle-plate G, secured to the upper surface of said lid next the side edge, of the brace D, having a stud, $f$, projecting laterally and journaled in the knuckles of said plate G, so as to oscillate alongside of said edge of the lid, and having an inwardly-projecting finger, F, which projects inward and rests upon the upper side edge of the tray, so that when the tray-lid is open the gravity of said brace keeps the finger resting upon the adjacent edge of the tray, and when the lid is opened as far as desired maintains it open.

CHARLES A. TAYLOR.

Witnesses:
 SAMUEL THOMPSON,
 FRANK D. THOMASON.